(12) United States Patent
Startup et al.

(10) Patent No.: US 6,366,775 B1
(45) Date of Patent: Apr. 2, 2002

(54) SIGNAL ACQUISTION METHOD AND APPARATUS

(75) Inventors: James W. Startup, Chandler; Jim E. Helm, Gilbert; Shawn Wesley Hogberg, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/263,551

(22) Filed: Mar. 8, 1999

(51) Int. Cl.⁷ .......................... H04Q 7/20; H04B 7/185
(52) U.S. Cl. .................. 455/427; 455/428; 455/12.1; 342/354; 342/357.1
(58) Field of Search ........................ 455/427, 428, 455/430, 12.1, 13.1, 13.2, 13.3, 13.4; 342/354, 357.1, 357.16, 357; 359/123

(56) References Cited

U.S. PATENT DOCUMENTS

| | | | | |
|---|---|---|---|---|
| 4,764,982 A | * | 8/1988 | Pfund | 359/112 |
| 5,659,545 A | | 8/1997 | Sowles et al. | 370/324 |
| 5,668,556 A | * | 9/1997 | Rouffet et al. | 342/354 |
| 6,002,916 A | * | 12/1999 | Lynch | 455/13.1 |
| 6,163,679 A | * | 12/2000 | Bakke et al. | 455/12.1 |
| 6,246,498 B1 | * | 6/2001 | Dishman et al. | 359/123 |

FOREIGN PATENT DOCUMENTS

EP    0317373    5/1989    ............ H04B/9/00

* cited by examiner

*Primary Examiner*—Tracy Legree
*Assistant Examiner*—Ray Persino
(74) *Attorney, Agent, or Firm*—Dana B. LeMoine; Sharon K. Coleman; Frank J. Bogacz

(57) ABSTRACT

A method and apparatus for acquiring satellite signals and subscriber unit signals utilizes broadcast beams (205) and acquisition beams (215) projected from a satellite (20). The broadcast beams (205) and acquisition beams (215) form broadcast acquisition beam pairs that are swept within the footprint (50) of the satellite (20) on the surface of the earth. Broadcast bursts are transmitted by the satellite (20) in the broadcast beams (205), and acquisition bursts broadcast by subscriber units (30) are received by the satellite (20) in acquisition beams (215).

10 Claims, 5 Drawing Sheets

SIGNAL ACQUISTION METHOD AND APPARATUS

FIELD OF THE INVENTION

This invention relates in general to communications systems and, in particular, to the acquisition of signals in satellite communications systems.

BACKGROUND OF THE INVENTION

Satellite communications systems are increasing in complexity. As markets and consumers of services demand more features and higher data rates, systems designers are forced to find ways to increase the information bearing capacity of each satellite in the satellite communications system. One result of this increased demand for bandwidth is an increase in the number of antenna beams, each narrower and with an increased gain, projected from each satellite towards the earth. An increase in the number of narrower beams allows for a corresponding increase in the number of users.

An undesirable by-product of the increased number of higher-gain beams is the increased satellite signal acquisition time experienced by ground stations and handsets.

What is needed is an apparatus and method for decreasing satellite signal acquisition time.

DETAILED DESCRIPTION OF THE DRAWINGS

The method and apparatus of the present invention provide for decreased signal acquisition time in a satellite communications system through the use of pairs of broadcast beams and acquisition beams projected from a satellite to the surface of the earth. Broadcast beams, which have beamwidths substantially less than the satellite's footprint on the earth are swept across the surface of the earth, and are followed by acquisition beams which have similar beamwidths. The broadcast beams broadcast bursts so that subscriber units within the broadcast beamwidth are notified that an acquisition beam is soon to follow. Subscriber units receiving broadcasts then advantageously acquire the satellite by transmitting in the acquisition beam. By using beam pairs with beamwidths substantially narrower than the satellite footprint, antenna gain is advantageously increased, and by sweeping beam pairs rather than illuminating the entire footprint simultaneously, power is advantageously saved.

Figure 1:
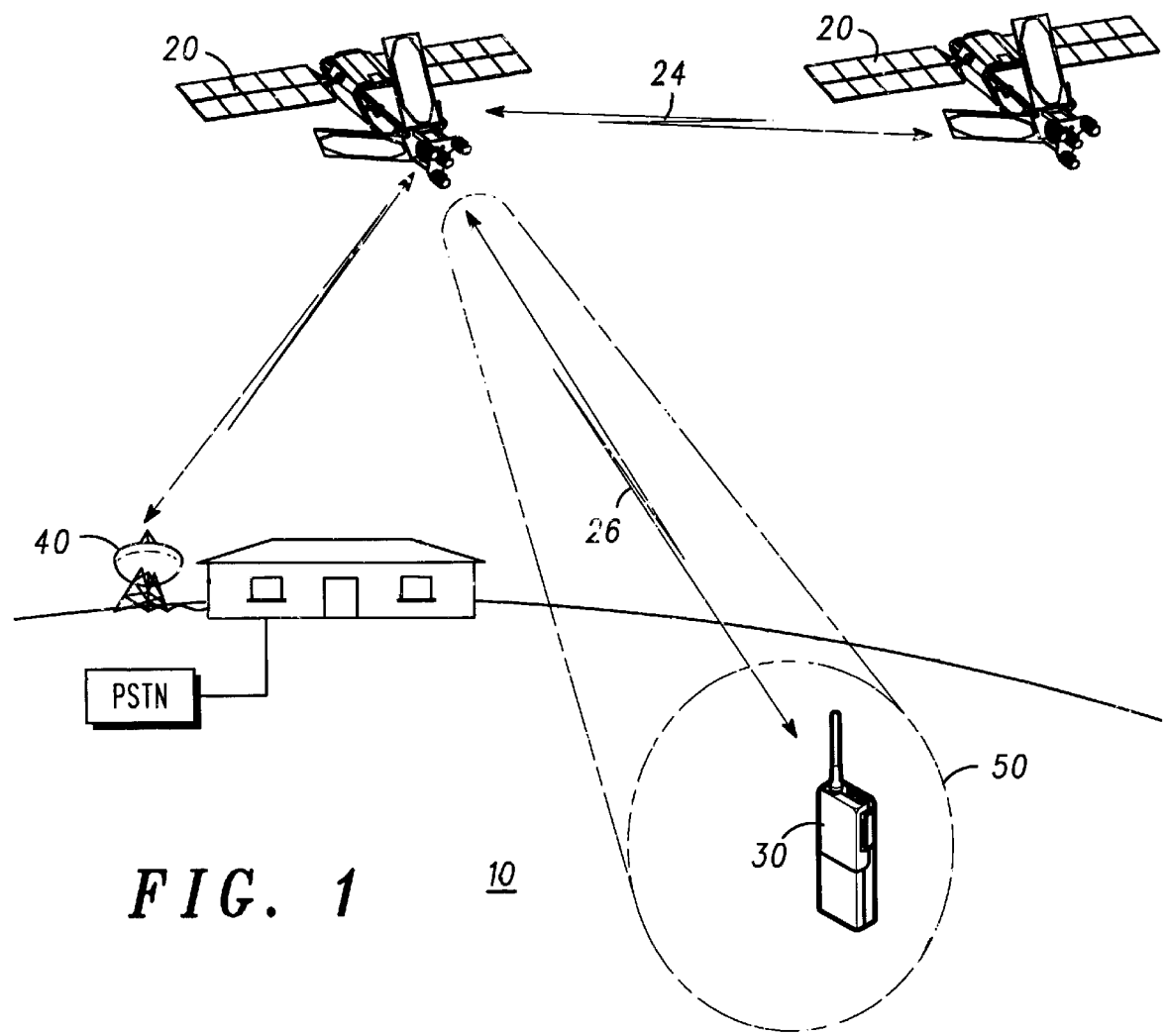
FIG. 1 shows a satellite communications system in accordance with a preferred embodiment of the present invention.

Turning now to the drawings in which like reference characters indicate corresponding elements throughout the several views, attention is first directed to FIG. 1. FIG. 1 shows a highly simplified diagram of satellite communication system 10. As shown in FIG. 1, communication system 10 comprises at least one satellite 20, any number of subscriber units 30, and at least one base station 40. Generally, satellites 20, subscriber units 30 and base station 40 of communication system 10 may be viewed as a network of nodes. All nodes of communication system 10 are, or may be in data communication with other nodes of communication system 10 through communication links. In addition, all nodes of communication system 10 are or may be in data communication with other communications devices dispersed throughout the world through public switched telephone networks (PSTNs) and/or conventional terrestrial communication devices coupled to a PSTN through conventional terrestrial base stations.

A "satellite" as used throughout this description means a man-made object or vehicle intended to orbit the earth. A "satellite" comprises geostationary, low-earth, medium-earth, and high-earth orbiting satellites and/or any combination thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. A "subscriber unit" means any device capable of communicating with the communications system. Subscriber units can be on the surface of the earth, such as a mobile phone, or can be above the surface of the earth, such as in an airplane.

The present invention is applicable to space-based communication systems having at least one satellite 20 in low-earth, medium-earth, high-earth, or geosynchronous orbit. Satellite 20 may be a single satellite or one of many satellites 20 in a constellation of satellites orbiting earth. The present invention is also applicable to space-based communication systems having satellites 20 which orbit earth at any angle of inclination including polar, equatorial, inclined or other orbital patterns. The present invention is applicable to systems where full coverage of the earth is not achieved (i.e., where there are "holes" in the communication coverage provided by the constellation) and to systems where plural coverage of portions of the earth occur (i.e., more than one satellite is in view of a particular point on the earth's surface).

Each satellite 20 preferably communicates with other nearby satellites through cross-links 24 that form a backbone of space-based mobile communication system 10. Satellites 20 can also be arranged in a constellation without cross-links 24 so that all communications with satellites 20 originate from, and are sent to, points on or above the earth. The present invention is applicable in the presence of cross-links 24 and in the absence of cross-links 24.

Gateway 40 communicates with satellites 20. There may be multiple gateways 40 located at different regions on the earth. For example, there may be one gateway located in Honolulu, another gateway located in Los Angeles and another gateway in Washington, D.C. Another example is to have separate gateways located in each country on the earth. Gateways 40 receive from satellite 20 and/or transmit to satellites 20 voice and/or data. Gateways also communicate with other communications systems, such as the internet and PSTNs, thereby interconnecting subscriber units 30 with other earth-bound and non-earth-bound communications users. Communications from SUs 30 to gateways 40 typically travel on a link 26 from a subscriber unit to one or more satellites 20, and then from the one or more satellites 20 to a gateway 40.

Satellite 20 is capable of communicating with subscriber units that are within the satellite's field of view. The field of view of the satellite projects footprint 50 on the surface of the earth. Any subscriber unit 30 within the satellite's field of view, whether above the earth, or within footprint 50 on the surface of the earth, can communicate with satellite 20 once signals have been acquired. Satellite 20 acquires the signal from subscriber unit 30, and subscriber unit 30 acquires the signal from satellite 20. The acquisition of signals is more fully described with reference to the remaining figures.

Figure 2:
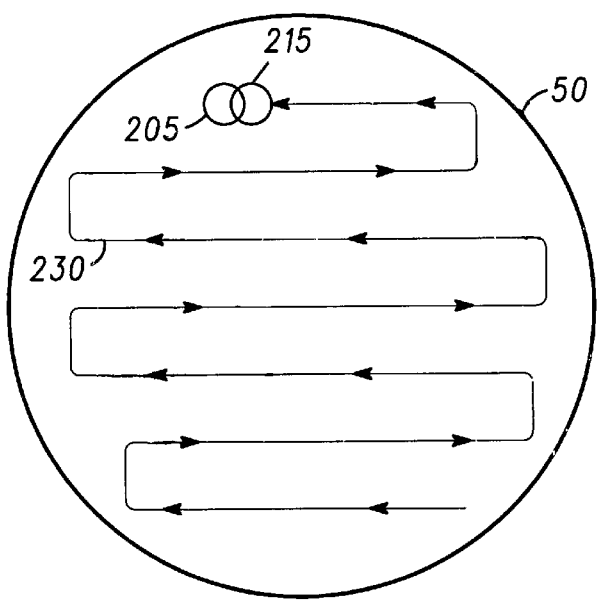
FIG. 2 shows a satellite footprint in accordance with a first embodiment of the present invention.

FIG. 2 shows a satellite footprint in accordance with a first embodiment of the present invention. Satellite footprint 50 is shown as it is seen from satellite 20 (FIG. 1). Included within satellite footprint 50 is the footprint of broadcast beam 205, and the footprint of acquisition beam 215. Also shown within satellite footprint 50 is beam path 230. Broadcast beam 205 and acquisition beam 215 are antenna beams projected from satellite 20 (FIG. 1) that have beamwidths substantially narrower than satellite footprint 50. Broadcast beam 205 and acquisition beam 215 form a single broadcast acquisition beam pair that traverses beam path 230 within satellite footprint 50. In a preferred embodiment, beam path 230 traverses satellite footprint 50 in its entirety by alternating in a pattern as substantially shown in FIG. 2.

Because the broadcast acquisition beam pair traverses substantially all of satellite footprint 50, broadcast beam 205 and acquisition beam 215 pass over any subscriber units within satellite footprint 50. This includes subscriber units on the surface of the earth as well as subscriber units above the surface of the earth that are within the field of view of the satellite. The satellite preferably broadcasts bursts in broadcast beam 205, and listens for acquisition bursts in acquisition beam 215. Subscriber units within satellite footprint 50 listen for broadcast bursts. When a broadcast burst is detected by a subscriber unit, the subscriber unit is within broadcast beam 205. Sometime after detecting the broadcast burst within broadcast beam 205, the subscriber unit responds with an acquisition burst. The subscriber unit is preferably within acquisition beam 215 when transmitting the acquisition burst.

In a preferred embodiment, the subscriber unit has knowledge of the rate at which the broadcast acquisition beam pair is swept through beam path 230. This allows the subscriber unit to synchronize the transmission of the acquisition burst with the sweep rate of the broadcast acquisition beam pair such that the subscriber unit is within acquisition beam 215 when transmitting the acquisition burst. In a satellite communications system that communicates in discrete frames of time, such as a time domain multiple access (TDMA) system, the sweep rate of the broadcast acquisition beam pair is preferably synchronized to the frame rate. For example, the time it takes for a point on the surface of the earth to transition from the center of broadcast beam 205 to the center of acquisition beam 215 is preferably equal to the time between successive frames. This allows a subscriber unit to receive a broadcast burst in a first frame, and to then transmit an acquisition burst in the very next frame.

When the satellite detects an acquisition burst, the satellite preferably trains a dedicated acquisition beam on the subscriber unit. For example, when the satellite receives the acquisition burst in acquisition beam 215, the satellite can stop sweeping acquisition beam 215, thereby leaving it trained on the subscriber unit. In this embodiment, broadcast beam 205 continues to sweep, and a new acquisition beam is formed to sweep along with broadcast beam 205. Alternatively, the broadcast acquisition beam pair that includes broadcast beam 205 and acquisition beam 215 can continue sweeping together along beam path 230 while a new acquisition beam is formed to train on the subscriber unit.

An acquisition beam can be trained on a single subscriber unit or multiple subscriber units. For example, in populated areas where multiple subscriber units exist within a single beamwidth, it is advantageous to position the beam such that the multiple subscriber units are all within the beam.

The embodiment shown in FIG. 2 is advantageous in part because two narrow beams are utilized to illuminate satellite footprint 50. By using beams having beamwidths substantially narrower than satellite footprint 50, antenna gain is increased, and the potential number of serviceable subscriber units is also increased. Yet another advantage is power savings. Power is consumed within the satellite in the process of forming beams. By using only two beams, and then generating additional acquisition beams only as necessary, substantial amounts of power are saved within the satellite.

Figure 3:
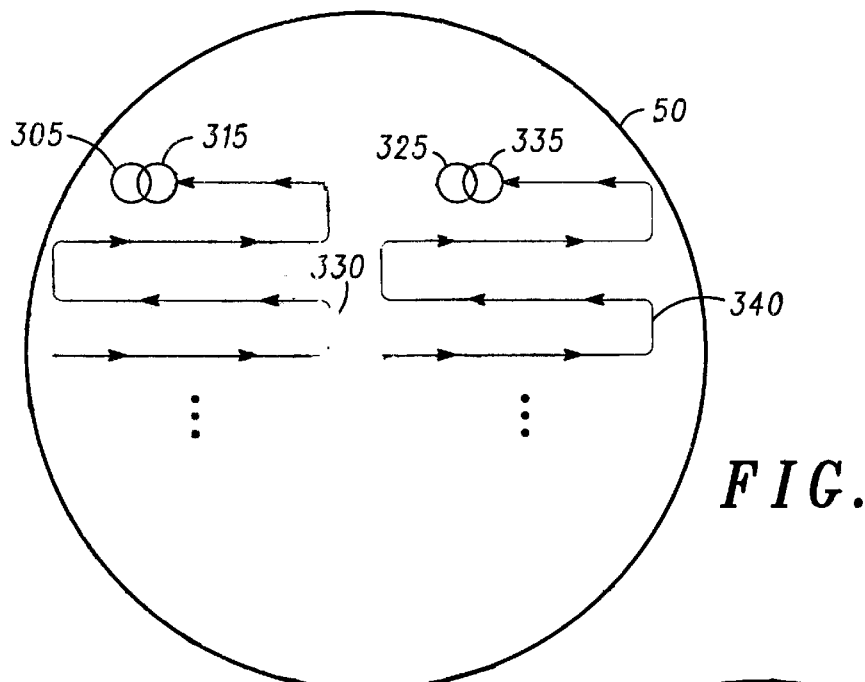
FIG. 3 shows a satellite footprint in accordance with a second embodiment of the present invention.

FIG. 3 shows a satellite footprint in accordance with a second embodiment of the present invention. In the second embodiment multiple broadcast acquisition beam pairs exist. Two broadcast acquisition beam pairs are shown within satellite footprint 50 in FIG. 3, but any number can exist while practicing the present invention. The first beam pair includes broadcast beam 305 and acquisition beam 315, and is swept across beam path 330. The second beam pair includes broadcast beam 325 and acquisition beam 335, and is swept across beam path 340. For any given beam pair that is swept across its corresponding beam path, the operation is preferably the same as in the first embodiment wherein a single beam pair exists within satellite footprint 50.

The second embodiment is advantageous in part because, for a given sweep rate, the time required to traverse satellite footprint 50 is reduced while still providing for power savings. The time required to traverse satellite footprint 50 is further reduced when the number of broadcast acquisition beam pairs is increased.

Figure 4:
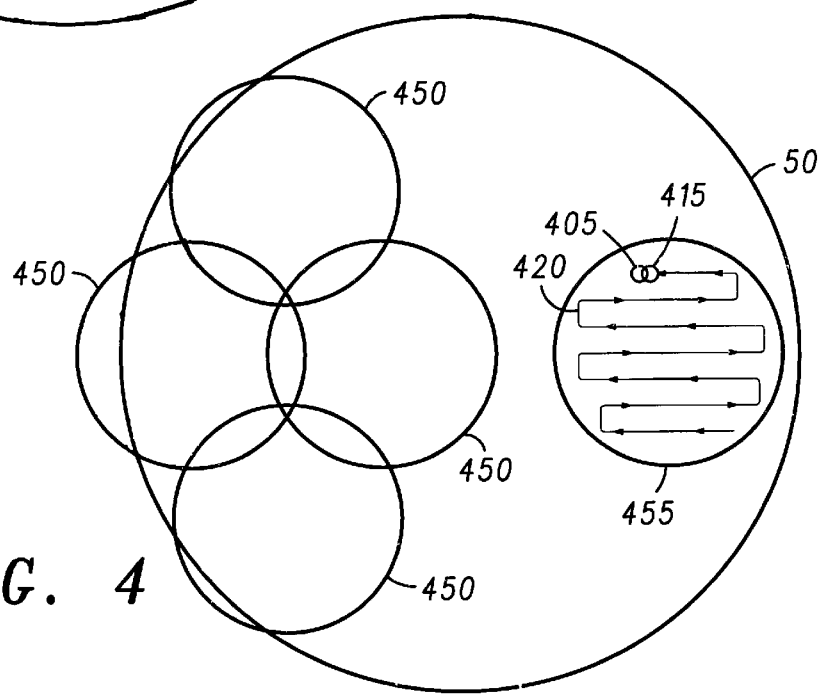
FIG. 4 shows a satellite footprint in accordance with a third embodiment of the present invention.

FIG. 4 shows a satellite footprint in accordance with a third embodiment of the present invention. The third embodiment includes the use of burst acquisition beams 450 and 455. Burst acquisition beams 450 and 455 have beamwidths narrower than satellite footprint 50, and wider than broadcast beam 405 and acquisition beam 415. The number and size of burst acquisition beams can advantageously be modified depending on the communication activity within satellite footprint 50. For example, in densely populated areas where many subscriber units are simultaneously active, the number of burst acquisition beams can be increased.

The satellite preferably alternatingly broadcasts bursts within each of the burst acquisition beams and then listens for acquisition bursts within the same beams. When the satellite detects an acquisition burst within a burst acquisition beam, such as burst acquisition beam 455, processing analogous to that of either the first or second embodiments takes place within the footprint of burst acquisition beam 455. This includes the generation of broadcast beam 405, acquisition beam 415, and the sweeping of both along beam path 420. Of course, multiple broadcast acquisition beam pairs can be formed within the footprint of burst acquisition beam 455.

The third embodiment is advantageous in part because the satellite can perform detection rather than demodulation when it receives an acquisition burst in a burst acquisition beam. Since detection requires less link margin than does demodulation, the wider and lower-gain burst acquisition beams can be used to coarsely locate subscriber units prior to the generation of the more narrow broadcast acquisition beam pairs.

Figure 5:
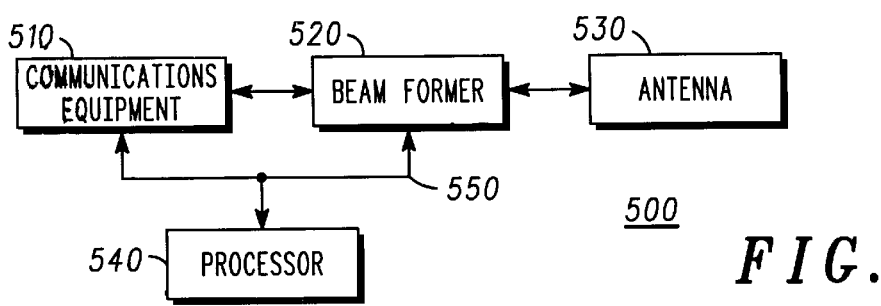
FIG. 5 shows a diagram of a satellite in accordance with a preferred embodiment of the present invention.

FIG. 5 shows a diagram of a satellite in accordance with a preferred embodiment of the present invention. Satellite 500 includes communications equipment 510, beamformer 520, antenna 530, processor 540, and processor bus 550. Communications equipment 510 can be any type of signal generation and reception hardware known in the art, the specifics of which are not important to the present invention. Beamformer 520 receives signals from communications equipment 510 and forms beams which are projected from antenna 530. Processor 540 is programmed with software capable of communicating with communications equipment 510 and beamformer 520. Capabilities include: commanding communications equipment 510 to generate broadcast bursts; receiving from communications equipment 510 an indication of a received acquisition burst; and commanding beamformer 520 to generate and sweep broadcast beams, acquisition beams, and burst acquisition beams.

Figure 6:
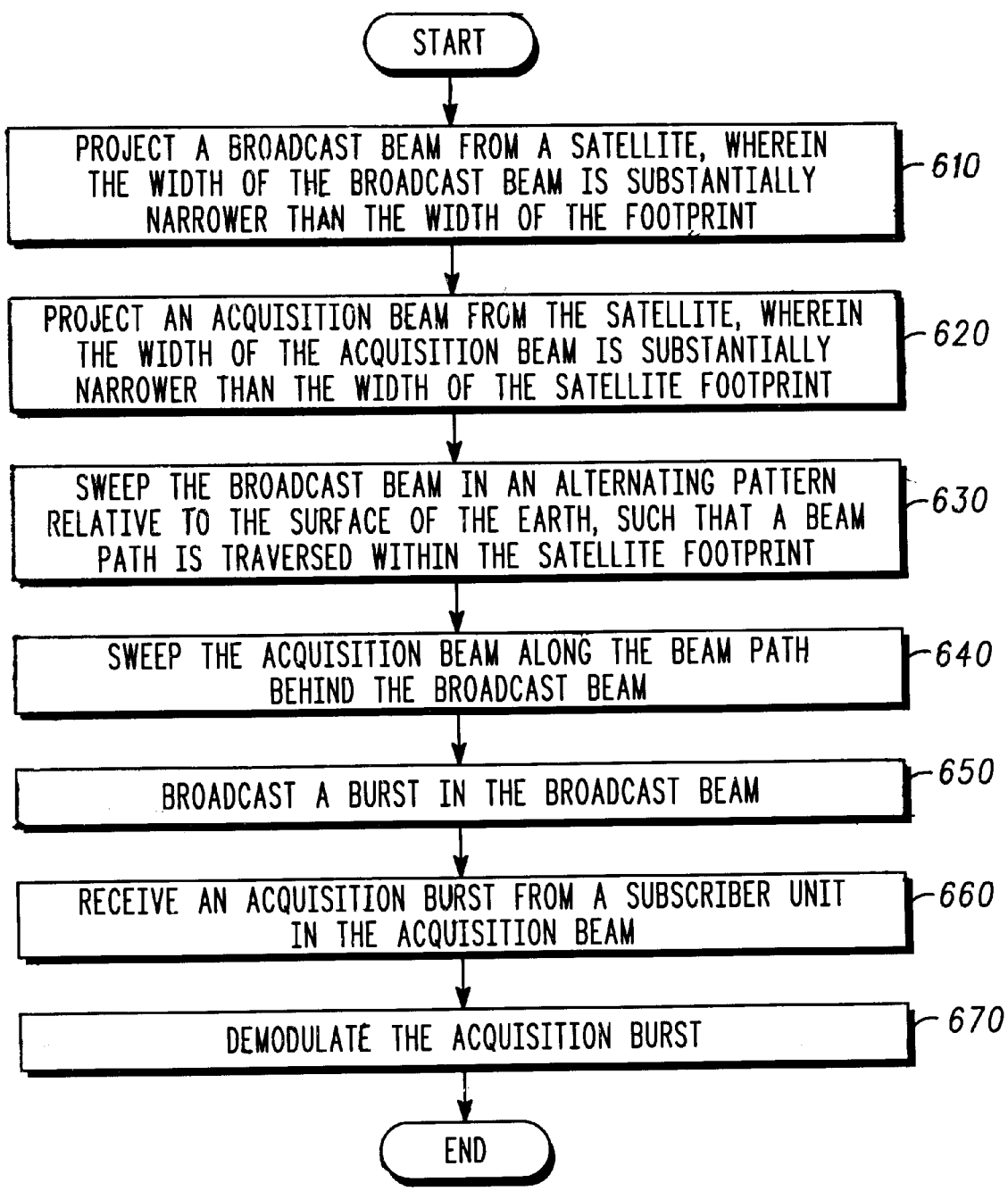
FIG. 6 shows a flowchart of a method of acquiring a signal in accordance with a first embodiment of the present invention.

FIG. 6 shows a flowchart of a method of acquiring a signal in accordance with a first embodiment of the present invention. Method 600 is a method performed within a satellite, such as satellite 500 (FIG. 5) or satellite 20 (FIG. 1). A partial result of performing the method of FIG. 6 is a satellite footprint and broadcast acquisition beam pair as shown in FIG. 2.

Method 600 begins with step 610 when a broadcast beam is projected from a satellite. The broadcast beam is preferably substantially narrower than the width of the satellite footprint. Then in step 620, an acquisition beam is projected from the satellite. The acquisition beam, like the broadcast beam, is preferably substantially narrower than the width of the satellite footprint. Then in step 630, the broadcast beam is swept within the satellite footprint. The path traversed by the broadcast beam is the beam path. The beam path preferably alternates back and forth relative to the surface of the earth such that the entire satellite footprint is traversed. Then in step 640, the acquisition beam is swept along the beam path behind the broadcast beam.

As the broadcast beam and acquisition beam are swept, bursts are broadcast in the broadcast beam in step 650. In step 660 an acquisition burst is received in an acquisition beam from a subscriber unit, and then in step 670 the acquisition burst is demodulated.

Figure 7:
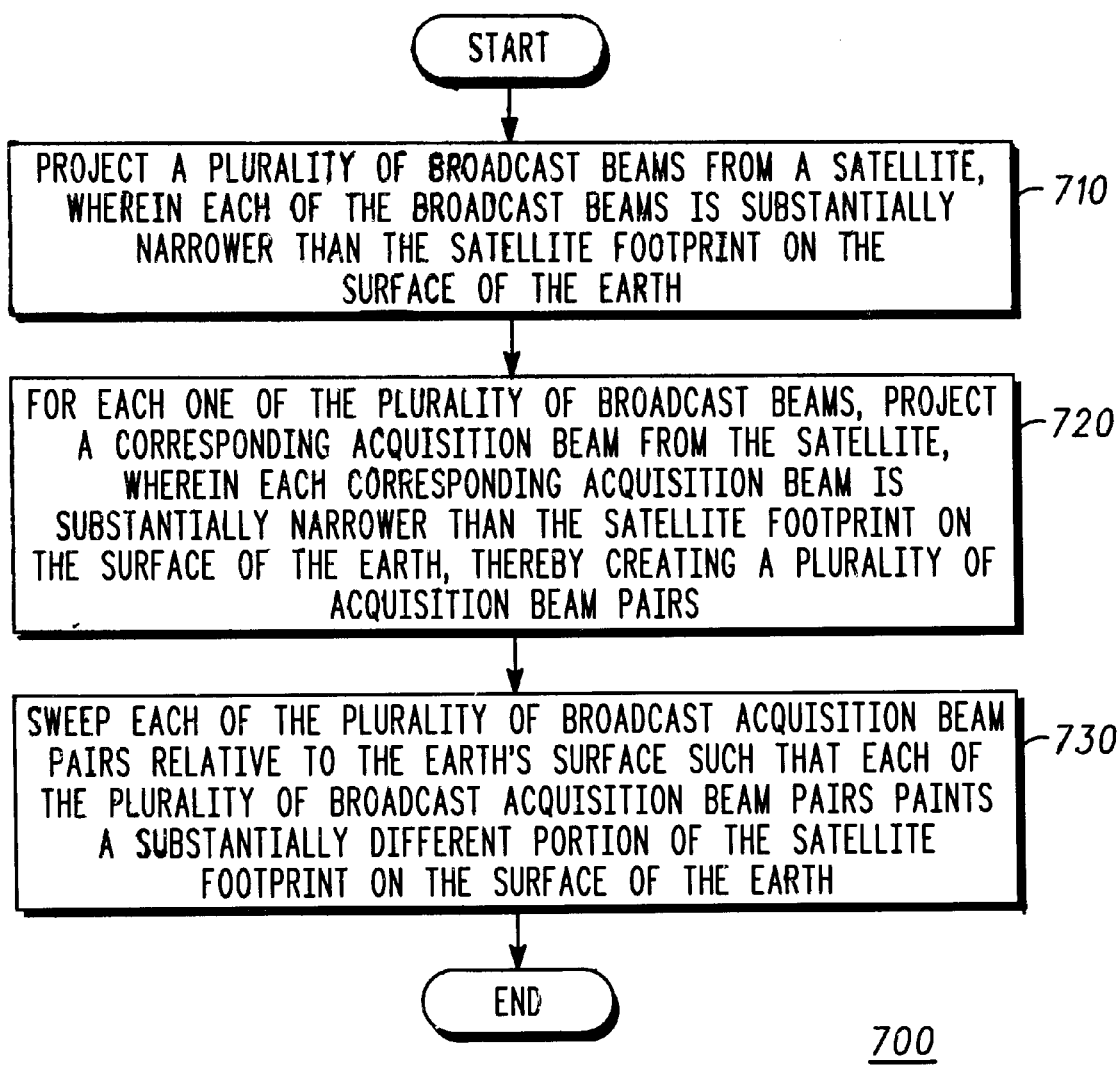
FIG. 7 shows a flowchart of a method of acquiring a signal in accordance with a second embodiment of the present invention.

FIG. 7 shows a flowchart of a method of acquiring a signal in accordance with a second embodiment of the present invention. Method 700 is preferably performed in a satellite such as satellite 500 (FIG. 5) or satellite 20 (FIG. 1). A partial result of performing method 700 is the multiple broadcast acquisition beam pairs and their corresponding beam paths as shown in FIG. 3.

Method 700 begins with step 710 when a plurality of broadcast beams is projected from a satellite. Each of the broadcast beams is substantially narrower than the satellite footprint on the surface of the earth. Then in step 720, an acquisition beam is projected for each of the broadcast beams, thereby creating a plurality of broadcast acquisition beam pairs. The acquisition beams, like the broadcast beams, are preferably substantially narrower than the satellite footprint on the surface of the earth. In step 730, the plurality of broadcast acquisition beam pairs are swept relative to the earth's surface such that each of the broadcast acquisition beam pairs paint a different portion of the satellite footprint. Each broadcast acquisition beam pair of method 700 is analogous to the broadcast acquisition beam pair of method 600 (FIG. 6). Accordingly, all of the steps of method 600 can be performed for each broadcast acquisition beam pair within method 700.

Figure 8:
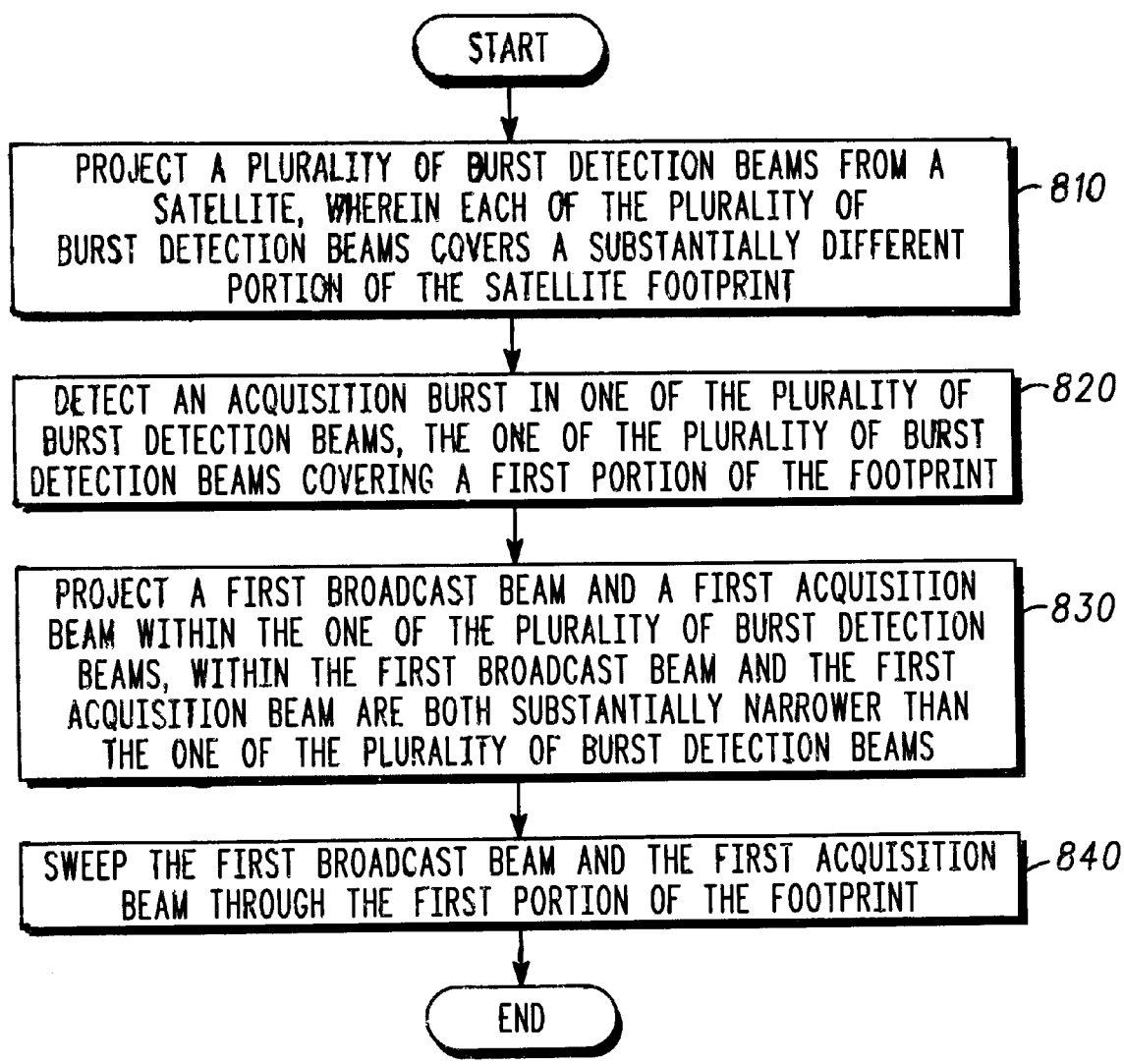
FIG. 8 shows a flowchart of a method of acquiring a signal in accordance with a third embodiment of the present invention.

FIG. 8 shows a flowchart of a method of acquiring a signal in accordance with a third embodiment of the present invention. Method 800, like methods 600 and 700, are preferably performed within satellite 500 (FIG. 5) or satellite 20 (FIG. 1). A partial result of performing the steps of method 800 is a satellite footprint as shown in FIG. 4.

Method 800 begins with step 810 when a plurality of burst detection beams are projected from a satellite. Each of the plurality of burst detection beams preferably covers a substantially different portion of the satellite footprint. In addition, burst detection beams are preferably narrower than the satellite footprint and wider than broadcast beams and acquisition beams.

In step 820 an acquisition burst is detected in one of the burst detection beams. Then in step 830, a broadcast acquisition beam pair is formed within the footprint of the burst detection beam that detected an acquisition burst in step 820. The broadcast beam and acquisition beam are preferably both substantially narrower than the burst detection beamwidth within which they operate. Then in step 840, the broadcast acquisition beam pair is swept within the footprint of the burst detection beam that detected an acquisition burst in step 820. At this point, beam forming and sweeping that occurs within the footprint of the burst acquisition beam can be that of any embodiment previously described herein.

In summary, the method and apparatus of the present invention provides an advantageous means for acquiring a signal through the generation and sweeping of broadcast beams and acquisition beams within satellite footprints on the surface of the earth. While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. In a satellite having a footprint on the surface of the earth, a method of decreasing the acquisition time of a signal, said method comprising the steps of:

projecting a plurality of broadcast beams from the satellite toward the surface of the earth, wherein each of the broadcast beams is substantially narrower than the footprint on the surface of the earth;

for each one of the plurality of broadcast beams, projecting a corresponding acquisition beam from the satellite toward the surface of the earth, wherein each corresponding acquisition beam is substantially narrower than the footprint on the surface of the earth, thereby creating a plurality of broadcast acquisition beam pairs;

sweeping each of the plurality of broadcast acquisition beam pairs relative to the earth's surface such that each of the plurality of broadcast acquisition beam pairs paints a substantially different portion of the footprint on the surface of the earth.

2. The method of claim 1, wherein a first broadcast acquisition beam pair of the plurality of broadcast acquisition beam pairs includes a first broadcast beam and a first acquisition beam, and the first broadcast acquisition beam pair paints a first portion of the footprint on the surface of the earth, wherein the step of sweeping comprises the steps of:

moving the first broadcast beam in an alternating pattern across the first portion of the footprint on the surface of the earth, thereby creating a beam path which traverses substantially entirely the first portion of the footprint on the surface of the earth.

3. The method of claim 2 wherein communications are carried out in discrete frames of time, and the time difference between successive frames is a frame time, and wherein the step of sweeping further comprises the steps of:

moving the first acquisition beam across the first portion of the footprint on the surface of the earth in the same alternating pattern as the first broadcast beam, wherein the first acquisition beam visits points on the earth substantially one frame time after the first broadcast beam.

4. The method of claim 3 further comprising the steps of:

broadcasting a signal in the first broadcast beam;

receiving a return signal from a subscriber unit in the first acquisition beam; and demodulating the return signal.

5. The method of claim 4 further comprising the steps of:

stopping movement of the first acquisition beam relative to the surface of the earth; and transmitting to the subscriber unit in the first acquisition beam.

6. In a satellite having a footprint on the surface of the earth, a method comprising:

projecting a plurality of burst detection beams, wherein each of the plurality of burst detection beams covers a substantially different portion of the footprint;

detecting a communications burst in one of the plurality of burst detection beams, the one of the plurality of burst detection beams covering a first portion of the footprint;

projecting a first broadcast beam and a first acquisition beam within the one of the plurality of burst detection beams, wherein the first broadcast beam and the first acquisition beam are both substantially narrower than the one of the plurality of burst detection beams; and sweeping the first broadcast beam and the first acquisition beam through the first portion of the footprint.

7. The method of claim 6 wherein the step of sweeping comprises the step of moving the first broadcast beam in an alternating pattern across the first portion of the footprint on the surface of the earth, thereby creating a beam path which traverses substantially entirely the first portion of the footprint on the surface of the earth.

8. The method of claim 7 wherein communications are carried out in discrete frames of time, and the time difference between successive frames is a frame time, and wherein the step of sweeping further comprises the steps of:

moving the first acquisition beam across the first portion of the footprint on the surface of the earth in the same alternating pattern as the first broadcast beam, wherein the first acquisition beam visits points on the earth substantially one frame time after the first broadcast beam.

9. The method of claim 8 further comprising the steps of:

broadcasting a signal in the first broadcast beam;

receiving a return signal from a subscriber unit in the first acquisition beam; and demodulating the return signal.

10. The method of claim 9 further comprising the steps of:

stopping movement of the first acquisition beam relative to the surface of the earth; and transmitting to the subscriber unit in the first acquisition beam.

* * * * *